US006502098B2

(12) United States Patent
Lau

(10) Patent No.: US 6,502,098 B2
(45) Date of Patent: *Dec. 31, 2002

(54) EXPORTING AND IMPORTING OF DATA IN OBJECT-RELATIONAL DATABASES

(75) Inventor: Leo Tat Man Lau, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/095,446

(22) Filed: Mar. 13, 2002

(65) Prior Publication Data

US 2002/0133510 A1 Sep. 19, 2002

Related U.S. Application Data

(63) Continuation of application No. 09/404,436, filed on Sep. 22, 1999, now Pat. No. 6,381,600.

(51) Int. Cl.[7] .............................. G06F 7/00; G06F 17/00
(52) U.S. Cl. ........................ 707/100; 707/6; 707/7; 707/10; 707/101; 707/102; 707/103; 707/104; 707/1; 707/2; 707/3; 707/4; 717/151; 717/157
(58) Field of Search .................. 707/6, 7, 10, 100–104, 707/1, 2, 3, 4; 717/131, 137

(56) References Cited

U.S. PATENT DOCUMENTS

| | | | |
|---|---|---|---|
| 4,852,019 A | 7/1989 | Vinberg et al. | 345/400 |
| 4,894,771 A | 1/1990 | Kunii et al. | 707/4 |
| 5,201,046 A | 4/1993 | Goldberg et al. | 707/100 |
| 5,295,256 A | 3/1994 | Bapat | 717/137 |
| 5,432,942 A | 7/1995 | Trainer | 717/131 |
| 5,499,358 A | 3/1996 | Nevarez | 707/101 |
| 5,504,886 A | 4/1996 | Chang et al. | 707/2 |
| 5,764,973 A | 6/1998 | Lunceford et al. | 707/1 |
| 5,799,310 A | 8/1998 | Anderson et al. | 707/102 |
| 6,208,990 B1 | 3/2001 | Suresh et al. | 707/6 |

FOREIGN PATENT DOCUMENTS

| | | |
|---|---|---|
| BE | 1005836 | 2/1994 |
| CA | 2151654 | 12/1996 |
| EP | 231119 | 8/1987 |
| JP | 05-225250 | 9/1993 |
| JP | 09-062547 | 3/1997 |
| WO | WO 94/15310 | 7/1994 |

OTHER PUBLICATIONS

Philip M. Sargent, "A Tabular Materials Data Interchange Format," http://www.sargents.demon.co.uk/Philip/matdat/tr162-ctdif.html, pp. 1–35, Aug. 1989.

Philip M. Sargent, "Technical Data Interchange Using Tabular Formats," Journal of Chemical Information And Computer Sciences, vol. 31, No. 2, pp. 297–300, May 1991.

Hansen, "Data Conversion Services," http://www.hansen.com/services/dataconv.html, pp. 1–6, 1997.

TA Standish, "Data Structure Techniques," Published: Reading, MA, USA, pp. xvi+447, 1980.

(List continued on next page.)

Primary Examiner—Diane D. Mizrahi
(74) Attorney, Agent, or Firm—Sughrue Mion, PLLC

(57) ABSTRACT

A computer system for transferring data from an object relational database to another such database. The data in the source database having a table type hierarchy of data tables. The system transforming data from the source database to a flat file format data transfer file using a defined tree traversal order. The columns and subcolumns of the data transfer file corresponding to types and attributes from the source database type hierarchy; The data transfer file having a type identifier column corresponding to a type in the table type hierarchy. The system permitting the inputting of the data from the data transfer file to a target database having a table type hierarchy corresponding to the table type hierarchy of the source database.

28 Claims, 2 Drawing Sheets

OTHER PUBLICATIONS

WTS Deich, "Electrolog: An Online Logsheet (Observatories Data Logging)," Proceedings of the SPIE—The International Society For Optical Engineering, vol. 3351, pp. 279–296, 1998.

SA Wilson, "Using SAS Views For Data Source Visualization," Proceedings of the Twenty–First Annual SAS Users Group International Conference, SUGI 21, Chicago, IL, USA, Mar. 10–13, 1996.

W. Dethlefsen, et al., "Computer Storage And Retrieval of Generic Chemical Structures in Patents. XII. Principles of Search Operations Involving Parameter Lists: Matching–Relations, User–Defined Match Levels, And Transition From The Reduced Graph Search to The Refined Search," Journal of Chemical Information And Computer Sciences, vol. 31, No. 2, pp. 253–260, May 1991.

D. Merrill, et al., "Codata Tools: Portable Software For Self–Describing Data Files," Computer Science And Statistics: Proceedings of the Fifteenth Symposium on The Interface, Houston, TX, USA, Mar. 1983.

RW Lind, "A Simplified Data Structure For Interactive Graphics on a Small Computer," Canadian Computer Conference Session 1972, Montreal, Que., Canada, Sponsored by: Canadian Information Processing Soc., Jun. 1–3, 1972.

MC Barnes, et al., "Storing Hierarchic Database Structures in Transposed Form," Software 73 Loughborough, Leics, UK, Sponsored by: SoftwareWorld, Jul. 9–11, 1973.

S. Abiteboul, "Querying Semi–Structured Data," Database Theory—ICDT '97. 6th International Conference Proceedings, Delphi, Greece, Sponsored by: Nat. Tech. Univ. Athens, Dept. Electr. Comput. Eng., Inst. Commun. & Comput. Syst., Hellenic Telecommun. Organ., et al., Jan. 8–10, 1997.

Ellis Horowitz, et al., "V. Mapping A Generic Document Onto The Relational Mode," Software Patent Institute Database of Software Technologies, Record Display, Record 29, Ser. No. iets1208.0089, pp. 855–857, Aug. 1, 1986.

Sakti P. Ghosh, "(Part 1 of 4) II. Extension of The Relational Model," Software Patent Institute Database of Software Technologies, Record Display, Record 9, Ser. No. iets1212.0004, pp. 1108–1109, Dec. 1, 1986.

Robin Williams, et al., "3. Data Definitions [From [Part I Fundamental Methodology]; Data Structures in Computer Graphics*],"Software Patent Institute Database of Software Technologies, Record Display, Record 5, Ser. No. acadp012.0089, pp. 170–171, Jan. 1, 1977.

Office of The Under Secretary of Defense For Acquisition, "ADA 9X Requirements Rationale: Composition of Program Units," Software Patent Institute Database of Software Technologies, Record Display, Record 25, Ser. No. ADA9XREQ.0023, May 1991.

EXPORTING AND IMPORTING OF DATA IN OBJECT-RELATIONAL DATABASES

FIELD OF THE INVENTION

This is a continuation of application Ser. No. 09/404,436 filed Sep. 22, 1999 now U.S. Pat. No. 6,381,600; the disclosure of which is incorporated herein by reference.

The present invention is directed to an improvement in computing systems and in particular to computer systems which provide for the exporting and importing of data in object-relational databases.

BACKGROUND OF THE INVENTION

Computer systems for the storage and retrieval of data typically include a mechanism for the transfer of data from one system or database to another. Where data is stored in accordance with a relational model, the data will typically be exchanged between one database management system (DBMS) and another or between databases in the same DBMS, by way of one number of predefined flat file formats which correspond to tabular representations of the data. Examples of such file formats are ASC or DEL formats (non-delimited and delimited ASCII representations used in the DB2™ system), the PC IXF file format (a binary representation used in the DB2™ system) and the WSF file format (a format corresponding to a Lotus™ spreadsheet representation of data). In object-relational databases, a table in the database is modelled as a class of objects. A user of an object-relational database may define table hierarchies by extending a supertype which defines a table in the database with additional attributes to define subtypes which are in turn used for table definition in the database. The user-defined hierarchy of types defines a table hierarchy which may be populated with data in accordance with the needs of a user. This table hierarchy may be represented as a tree-structure in which the nodes are type definitions corresponding to tables in the database. Once a user has created a database having a user-defined table hierarchy in an object-relational DBMS a file format reflecting the table hierarchy must be used to move the data a new system or database. Data in a user-defined object-relational database table hierarchy cannot be directly exported (i.e. copied without a mapping or transformation step) from one DBMS and imported into another DBMS in the flat file formats used for non-object oriented relational databases.

Prior art systems contain features to permit the translation of hierarchical data into relational models. For example, U.S. Pat. No. 5,201,046 to Goldberg dated Apr. 6, 1993 discloses a DBMS which stores, retrieves and manipulates directed graph data structures in a relational database. Similarly, U.S. Pat. No. 5,799,310 to Anderson dated Aug. 25, 1998 describes relational extenders for handling complex data types. In U.S. Pat. No. 5,295,256 to Bapat dated Mar. 15, 1994, a translator for translating instances of objects in an object oriented programming environment into a relational database schema is described.

Such prior art systems, do not consider the translation of data from an object-relational database hierarchy to a standard flat file data exchange file format for transfer to a second object-relational database. Rather such systems extend relational models by defining new types within relational database columns, as in Anderson and Goldberg, or use multiple tables to persistently store instances of run-time objects used in an object-oriented programming language, as in Bapat. These prior art approaches map the hierarchical data into SQL schemas. It is therefore desirable to have a computer system which includes the capacity to export object-relational hierarchical data in a pre-defined flat file format to permit exchange to a second object-relational database.

SUMMARY OF THE INVENTION

According to one aspect of the present invention, there is provided an improved system for manipulating data in object-relational databases.

According to another aspect of the present invention, there is provided a computer system for manipulating data in an object relational source database, the source database having data tables and a defined table type hierarchy with an associated tree structure, the system comprising, means for transforming data from the source database into a flat file data transfer file, comprising rows and columns, the means for transforming the source database comprising means for traversing the tree structure of the table type hierarchy using a tree traversal order, means for defining the columns in the data transfer file to correspond to the type definitions in the table type hierarchy for the source database, the means for defining the columns further comprising means for defining subcolumns corresponding to attributes defined in a respective type definition for a given column, the means for defining the columns further comprising means for defining a type identifier column corresponding to a type identifier determined during the traversal of the tree structure, the type identifier column values corresponding to defined types in the table type hierarchy and determined by the tree traversal order, the means for transforming data from the source database into the data transfer file further comprising means for copying rows of data from the tables in the source database into the data transfer file, each row in the data transfer file having a type identifier column value corresponding to the table in the table type hierarchy of the source database which is the source of the data in the row in the data transfer file.

According to another aspect of the present invention, there is provided the above computer system with input means for transforming data in the data transfer file to a target object relational database, the target object relational database having a table type hierarchy corresponding to the table type hierarchy of the source database, the input means comprising means for copying each row of data in the data transfer file to a target table in the target database, the target table being identified by the type identifier column value for the row of data in the data transfer file, the data for each column in the row of data in the data transfer file being copied to the column in the target table as defined by the tree traversal order.

According to another aspect of the present invention, there is provided the above computer system in which the tree traversal order is user-definable and is constrained to be a pre-order, depth-first traversal and in which the default tree traversal order is a pre-order depth-first traversal with a sibling selection based on creation time for the type.

According to another aspect of the present invention, there is provided the above computer system in which characteristics defining the table type hierarchy for the source database are stored in the data transfer file and in which the characteristics defining the table type hierarchy for the source database comprise a traverse order table and a type identifier control table.

According to another aspect of the present invention, there is provided the above computer system in which hierarchy characteristics defining the table type hierarchy for the source database are stored in the data transfer file and which further comprises means for creating the table type hierarchy for the target database from the hierarchy characteristics.

According to another aspect of the present invention, there is provided the above computer system in which the input means further comprises means for accepting an attribute list from a user, the attribute list corresponding to specified columns in the data transfer file and means for inputting only the specified columns of data from the data transfer file to the target database.

According to another aspect of the present invention, there is provided a computer program product for use with a computer comprising a central processing unit and random access memory, said computer program product comprising a computer usable medium having computer readable code means embodied in said medium for implementing a system as described above.

According to another aspect of the present invention, there is provided a method for manipulating data in an object relational source database, the source database having data tables and a defined table type hierarchy with an associated tree structure, the method comprising the steps of transforming data from the source database into a flat file data transfer file, comprising rows and columns, step of transforming the source database comprising the further steps of traversing the tree structure of the table type hierarchy using a tree traversal order, defining the columns in the data transfer file to correspond to the type definitions in the table type hierarchy for the source database, defining subcolumns corresponding to attributes defined in a respective type definition for a given column, defining a type identifier column corresponding to a type identifier determined during the traversal of the tree structure, the type identifier column values corresponding to defined types in the table type hierarchy and determined by the tree traversal order, copying rows of data from the tables in the source database into the data transfer file, each row in the data transfer file having a type identifier column value corresponding to the table in the table type hierarchy of the source database which is the source of the data in the row in the data transfer file.

According to another aspect of the present invention, there is provided the above method further comprising input steps for transforming data in the data transfer file to a target object relational database, the target object relational database having a table type hierarchy corresponding to the table type hierarchy of the source database, the input steps comprising copying each row of data in the data transfer file to a target table in the target database, the target table being identified by the type identifier column value for the row of data in the data transfer file, the data for each column in the row of data in the data transfer file being copied to the column in the target table as defined by the tree traversal order.

According to another aspect of the present invention, there is provided a computer program product tangibly embodying a program of instructions executable by a computer to perform the method steps described above.

Advantages of the present invention include a system which provides the ability to transfer object relational data from one database to another using a defined flat file format data transfer file.

BRIEF DESCRIPTION OF THE DRAWINGS

The preferred embodiment of the invention is shown in the drawings, wherein.

Figure 1:
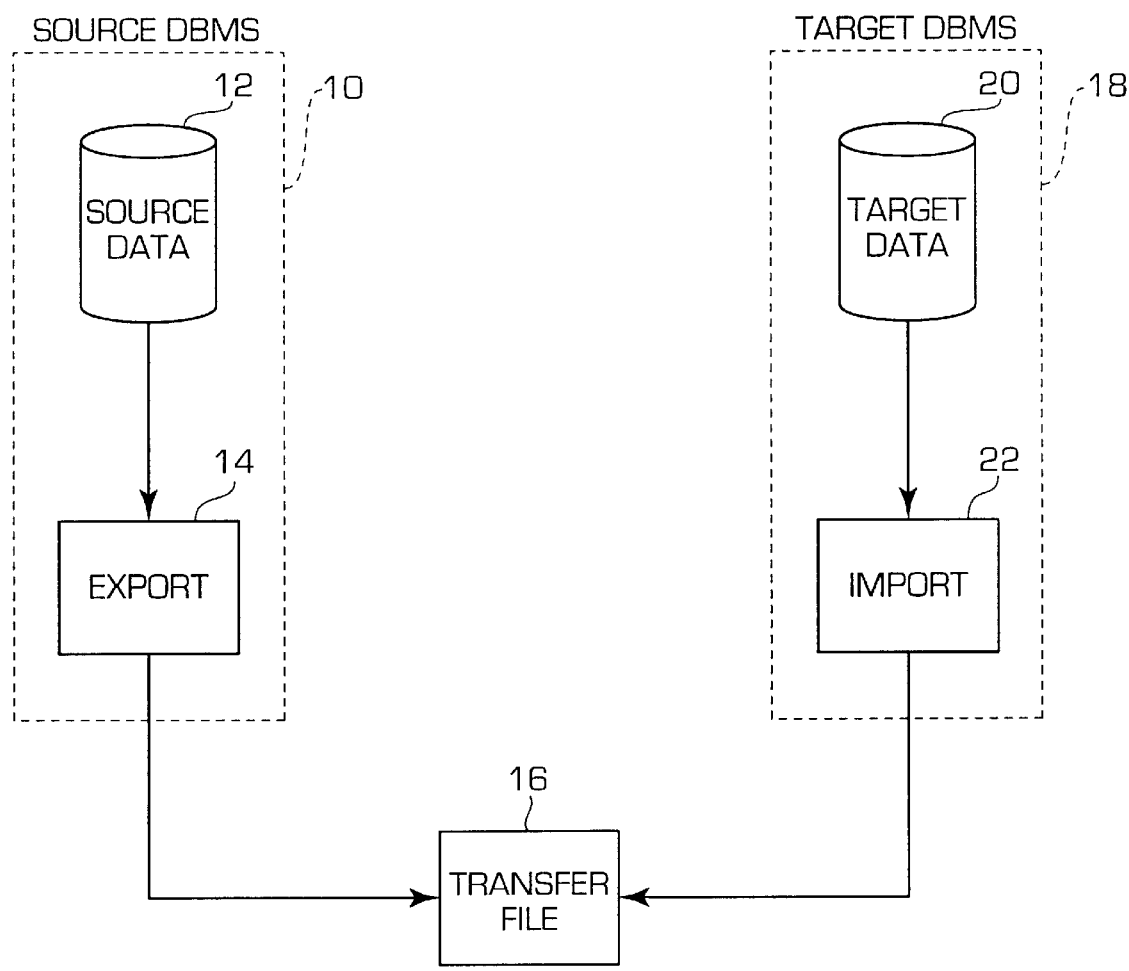
FIG. 1 is a schematic block diagram showing the high level representation of the data flow in the preferred embodiment of the invention.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The export and import of data in accordance with the preferred embodiment is shown in the schematic block diagram of FIG. 1. Source DBMS 10 contains source data 12 in an object-relational database, which data may be exported. Source data 12, in the example used to illustrate the preferred embodiment, has a set of defined types which make up a table hierarchy. Export transformation step 14 is shown with source data 12 as input and data transfer file 16 as output In accordance with the preferred embodiment of the invention, export transformation step 14 is shown as part of source DBMS 10. It will be understood by those skilled in the art that export transformation step 14 may be carried out by a process or module independent of source DBMS 10, or may be included (as in the preferred embodiment) as part of the commands of DBMS 10.

The import side of the system of the preferred embodiment is shown with reference to target DBMS 18. Target DBMS contains target data 20. In accordance with the preferred embodiment of the invention, the data in data transfer file 16 is imported by import transformation step 22, and the resulting data is stored in the hierarchical object-relational format of target data 20, which structure corresponds to all, or part of, the hierarchical structure of source data 12.

As may be seen from this high level description, in the preferred embodiment of the invention, object-relational DBMSs, shown in FIG. 1 as source DBMS 10 and target DBMS 18, are able to transfer data using the format of data transfer file 16. In the preferred embodiment, as described below, source data 12 and target data 20 have corresponding hierarchical object relational type definitions, while data transfer file 16 is a flat file of the type used for data transfer in prior art relational databases. It will be appreciated that the system of the preferred embodiment may also be used to transfer data from one database to another within the same DBMS, by way of the known format of data transfer file 16.

Figure 2:
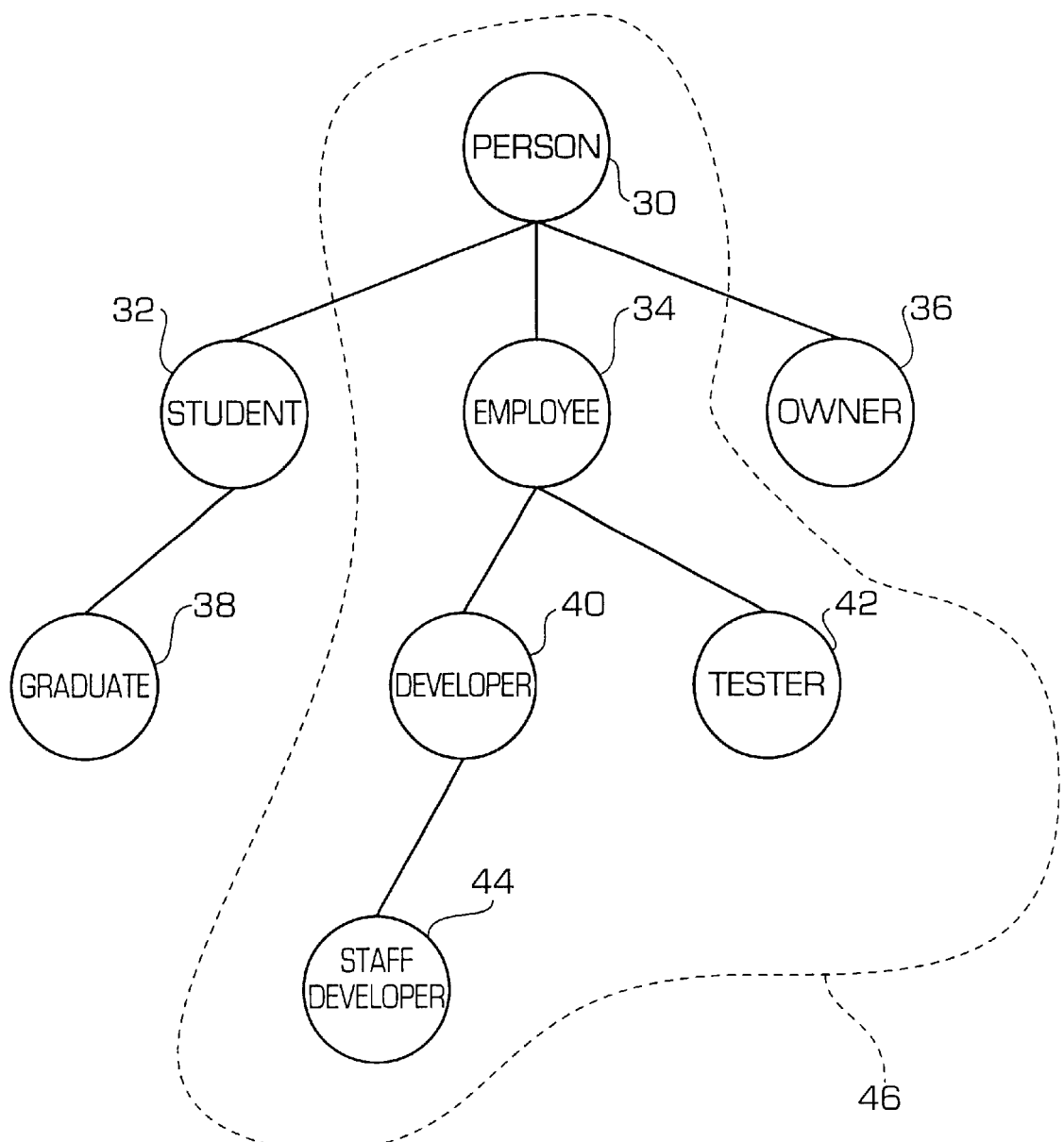
FIG. 2 is a tree diagram showing an example table hierarchy of types in an object relational database, the data for which is capable of being exported in accordance with the preferred embodiment of the invention.

Turning to FIG. 2, a tree diagram is shown for an object-relational database reflecting an example hierarchy of types which define tables in the database. In FIG. 2 the root node of the tree is the type Person 30. Type Person 30 in the example of FIG. 2 is defined to have attributes as set out below. Type Person 30 has subtypes which are shown as nodes Student 32, Employee 34, and Owner 36. Each level in the tree structure of FIG. 2 contains nodes representing sub-types of the node in the previous level in the tree. As is shown in FIG. 2, Graduate 38 is a subtype of Student 32. Similarly, the types Developer 40 and Tester 42 are subtypes of the type Employee 34. The last node, type StaffDeveloper 44 is a subtype of type Developer 40.

The definitions of the attributes found in each type shown in the example of FIG. 2 are as follows:

Person: Name char (30), Age int
Student: StudentNum int
Graduate: ThesisTopic char (30)
Employee: Salary int
Developer: LineItem char (30)
Tester: TeamLeader char (30)
StaffDeveloper: Component char (30)
Owner: BusinessAddr char (30)

As is apparent to those skilled in the art, the sub-types set out in FIG. 2, the attributes for which are shown above, inherit the attributes of their parent types.

For the example table hierarchy set out in FIG. 2 and described above, the export data transformation of the preferred embodiment (shown as export transformation 14 in FIG. 1) will traverse the tree of the hierarchy to create a flat file corresponding to data transfer file 16 shown in FIG. 1. Data transfer file 16 of the preferred embodiment is capable of representing the data of the data hierarchy defined by the user in source DBMS 10. The user defines which portion of the data in source data 12 is to be exported and data transfer file 16 will be generated by export transformation 14 by the traversal of the subtree of the tree hierarchy corresponding to the data defined to be exported. In the example tree hierarchy of FIG. 2, the portion to be exported is shown in the defined subtree 46.

According to the preferred embodiment of the invention, the traversal of the types in the table definition hierarchy may be carried out in one of several ways. The traversal order of the tree structure of source data 12 defines the columns of data transfer file 16.

The system of the preferred embodiment defaults to a depth-first pre-order tree traversal to generate the columns for data transfer file 16. In this traversal order, child nodes in the tree are traversed in the order in which the nodes where created (the first created type is traversed first). Alternatively, the user may specify a particular order for the traversal of the nodes in the table hierarchy tree. The user-defined tree traversal ordering is constrained to be a depth-first pre-order traverse.

For a user-specified traverse order, the system of the preferred embodiment requires that there be:

An identical definition of subtables in both the source and the target databases;

An identical hierarchical relationship among the subtables in both the source and target databases; and 1. An identical traverse order in both the export and import steps.

There are two alternative approaches for this user-specified traversal: the system of the preferred embodiment may embed information about the traversal order in data transfer file 16, or the user may elect not to embed the information in the file but to specify the traversal order at both export transformation step 14 and import transformation step 22. In the system of the preferred embodiment, the former approach, in which a record of all relevant types, their definitions and relevant tables is created in export transformation step 14, is available for PC/IXF format data transfer file 16. However, the decision to permit this information to be transferred for certain formats of data transfer file 16 is an implementation decision which will vary from system to system, depending on the requirements of users and details of the systems and file formats.

Where the user specifies the traversal order, the system of the preferred embodiment requires that the traversal be in pre-order. The pre-order traversal is one in which each branch in the hierarchy must be traversed to the bottom before a new branch is traversed.

The table corresponding to data transfer file 16 which is created by the system of the preferred embodiment for two records of sample data in the table hierarchy as shown in FIG. 2 is set out in Table 1, below:

TABLE 1

| TypeID | Person Name | Age | Employee Salary | Developer LineItem | Staff-Developer Component | Tester Team-Leader |
|---|---|---|---|---|---|---|
| 3 | John | 22 | 30,000 | Crash Recovery | Nil | Nil |
| 4 | Sam | 35 | 50,000 | Load | Load | Nil |

The system of the preferred embodiment, using the default depth-first pre-order traversal of the tree structure shown in FIG. 2 for subtree 46, will notionally generate a traverse order table as shown in Table 2, below (such a table is not expressly created in the system of the preferred embodiment):

TABLE 2

| Node | Traverse Order |
|---|---|
| Person | 1 |
| Employee | 2 |
| Developer | 3 |
| StaffDeveloper | 4 |
| Tester | 5 |

As is shown in Table 1, a column in the table is created for each node traversed in subtree 46. For each attribute defined in the node, a subcolumn is created. Thus for the node for type Developer 40, there is a LineItem column added to Table 1. The single table of data file transfer file 16 is therefore able to store data values for records in the different typed tables found in the table hierarchy of FIG. 2 in a flat file configuration.

The format of the table shown in Table 1 also includes a column for TypeID. This is a value derived from the traverse order of the tree traversal used to create Table 1. It represents the table from which a row in Table 1 is copied. The TypeID also corresponds to the values in Table 2, if such a table is maintained (the existence of Table 2 in the system of the preferred embodiment depends on the user's selection of traversal method).

The TypeID is used by import transformation step 22 to recreate the object-relational data in target data 20. In the example of Table 1, the TypeID 3 for the first row in the table specifies that the node in target data 20 to which the first row of data will be written is in Developer node 40 in the table hierarchy of FIG. 2. Similarly, TypeID 4 in the second row of data in Table 1 indicates that the data in that row is from StaffDeveloper node 44 in FIG. 2.

As the above indicates, the traversal order used to generate data transfer file 16 is used to determine how the data in source data 12 is written to the flat file, and specifies how data in data transfer file 16 is written to target data 20. Thus the traversal order defines the mapping between columns in data transfer file 16 and attributes in the tables in source data 12 and target data 20. As set out above, the traversal order may be specified by default, may be expressly stored in data transfer file 16, or may be input by the user as part of import transformation step 22.

In accordance with the preferred embodiment of the invention, where the traversal order information is stored in data transfer file 16, TypeID control information is stored as is shown in Table 3, below:

TABLE 3

| Name | StartingCol | EndingCol | Parent |
|---|---|---|---|
| Person | 1 | 2 | −1 |
| Employee | 3 | 3 | 0 |
| Developer | 4 | 4 | 1 |
| StaffDeveloper | 5 | 5 | 2 |
| Tester | 6 | 6 | 1 |

The information in Table 3 is used to recreate the hierarchical tree structure for the object relational data in Target DBMS 18. The columns StartingCol and EndingCol indicate where data transfer file 16 the attributes for the node specified in the Name column, may be found. Parent column in Table 3 is a pointer into the table itself (with zero-based indexing, and −1 representing a null pointer).

In the system of the preferred embodiment, the information found in the examples of Table 2 and Table 3 may be stored in data transfer file 16. In such a case, the system of the preferred embodiment provides that import transformation step 22 may create the table hierarchy specified by data transfer file 16. In the preferred embodiment, where the above information is not available in data transfer file 16, import transformation step 22 relies on the table hierarchy for the data to be pre-defined by the user in target data 20.

As may be seen by the above example, in the system of the preferred embodiment, the object relational data in a table hierarchy such as that shown in FIG. 2 may be written to data transfer file 16 in a flat file format as shown in Table 1. This format is consistent with other flat file formats for data exchanged between relational database systems and does not require special data structures for each defined table hierarchy. The same flat file format is available for all table hierarchies. Import transformation step 22 makes use of the data in the flat file format of data transfer file 16. Where necessary, tree traversal information shown in the examples of Table 2 and Table 3 is made available and used by import transformation step 22 in the copying of data into the defined table hierarchy in Target DBMS 18. The TypeID information found in data transfer file 16 specifies into which table in Target Data 20 the data in data transfer file 16 is to be copied.

In import transformation 22, the preferred embodiment provides that the user may specify an attributes list at the end of each subtable name to restrict the attributes that are moved to target data 20. If no attributes list is used, all the columns in each subtable are moved. Import transformation 22 also permits the user to specify which columns from the data transfer file are to be imported into target data 20. In the system of the preferred embodiment, the file type of data transfer file 16 will determine how the columns are designated (by start and end column numbers for ASC files, by names of columns for IXF files, and by column number for the IDF or DEL files).

In the system of the preferred embodiment, import transformation step 22 involves the copying of data in data transfer file 16 to target data 20. As described above, import transformation step 22 may create the type hierarchy for the tables of target data 20, when export transformation step 14 has stored the information detailing the type hierarchy in data transfer file 16. Alternatively, the table definition type hierarchy for target data 20 will be user-defined to accept the data from data transfer file 16 which is to be input in to target DBMS 18. Import transformation step 22 reads records from the table of data transfer file 16 and copies the records to the table in target data 20 as indicated by the TypeID value for each record (from the TypeID column in the flat file of data transfer file 16). In this way, the data which originated in source data 12 will be copied into the appropriately corresponding hierarchy in target data 20. The traversal order used to define the columns of data transfer file 16 will be used to determine the column to attribute mapping when copying data to target data 20 from data transfer file 16. In this way the data transfer between the two hierarchical object relational databases is achieved using the flat file of data transfer file 16. Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A computer system for manipulating data in an object relational source database, the source database having data tables and a defined table type hierarchy with an associated tree structure, the system comprising:
   means for transforming data from the source database into a flat file data transfer file including rows and columns, the means for transforming the source database including:
      means for traversing the tree structure of the table type hierarchy using a tree traversal order; and
      means for defining the columns in the data transfer file to correspond to the type definitions in the table type hierarchy for the source database.

2. The computer system of claim 1 wherein the means for defining the columns includes:
   means for defining subcolumns corresponding to attributes defined in a respective type definition for a given column; and
   means for defining a type identifier column corresponding to a type identifier determined during the traversal of the tree structure, the type identifier column values corresponding to defined types in the table type hierarchy and determined by the tree traversal order.

3. The computer system of 2 wherein the means for transforming data from the source database into the data transfer file further includes means for copying rows of data from the tables in the source database into the data transfer file, each row in the data transfer file having a type identifier column value corresponding to the table in the table type hierarchy of the source database which is the source of the data in the row in the data transfer file.

4. The computer system of claim 3, further comprising input means for transforming data in the data transfer file to a target object relational database, the target object relational database having a table type hierarchy corresponding to the table type hierarchy of the source database, the input means comprising means for copying each row of data in the data transfer file to a target table in the target database, the target table being identified by the type identifier column value for the row of data in the data transfer file, the data for each column in the row of data in the data transfer file being copied to the column in the target table as defined by the tree traversal order.

5. The computer system of claim 3 in which the tree traversal order is user-definable and is constrained to be a pre-order, depth-first traversal.

6. The computer system of claim 3 in which the default tree traversal order is a pre-order, depth-first traversal in which sibling selection is based on creation time of the type for the node in the tree.

7. The computer system of claim of claim 3 in which characteristics defining the table type hierarchy for the source database are stored in the data transfer file.

8. The computer system of claim 7 in which the characteristics defining the table type hierarchy for the source database comprise a type identifier control table.

9. The computer system of claim 4 in which hierarchy characteristics defining the table type hierarchy for the source database are stored in the data transfer file and which further comprises means for creating the table type hierarchy for the target database from the hierarchy characteristics.

10. The computer system of claim 9 in which the hierarchy characteristics comprise a type identifier control table.

11. The computer system of claim 4 in which the input means further comprises means for accepting an attribute list from a user, the attribute list corresponding to specified columns in the data transfer file and means for inputting only the specified columns of data from the data transfer file to the target database.

12. The computer system of claim 3 in which the data transfer file has a format selected from one of PC/IXF, worksheet, delimited ASCII and non-delimited ASCII, formats.

13. A computer program product for use with a computer including a central processing unit and random access memory, said computer program product including a computer usable medium having computer readable code means embodied in said medium for manipulating data in an object relational source, the source database having data tables and a defined table type hierarchy with an associate tree structure, said computer program product comprising:

computer readable program code means for causing a computer to transform data from the source database into a flat file data transfer file having rows and columns, including:
    means for traversing the tree structure of the table type hierarchy using a tree traversal order,
    means for defining the columns in the data transfer file to correspond to the type definitions in the table type hierarchy for the source database.

14. The computer program product of claim 13 wherein the means for defining the column includes:

means for defining subcolumns corresponding to attributes defined in a respective type definition for a given column; and
  means for defining a type identifier column corresponding to a type identifier determined during the traversal of the tree structure, the type identifier column values corresponding to defined types in the table type hierarchy and determined by the tree traversal order.

15. The computer program product of claim 14 wherein the computer readable program code means for causing a computer to transform data from the source database into the data transfer file further comprising means for copying rows of data from the tables in the source database into the data transfer file, each row in the data transfer file having a type identifier column value corresponding to the table in the table type hierarchy of the source database which is the source of the data in the row in the data transfer file.

16. The computer program product of claim 13, further comprising input means for transforming data in the data transfer file to a target object relational database, the target object relational database having a table type hierarchy corresponding to the table type hierarchy of the source database, the input means comprising means for copying each row of data in the data transfer file to a target table in the target database, the target table being identified by the type identifier column value for the row of data in the data transfer file, the data for each column in the row of data in the data transfer file being copied to the column in the target table as defined by the tree traversal order.

17. A method for manipulating data in an object relational source database, the source database having data tables and a defined table type hierarchy with an associated tree structure, comprising:

transforming data from the source database into a flat file data transfer file including rows and columns, wherein said transforming the source database including:
    traversing the tree structure of the table type hierarchy using a tree traversal order,
    defining the columns in the data transfer file to correspond to the type definitions in the table type hierarchy for the source database.

18. The method of claim 17 wherein said transforming the source database including:

defining subcolumns corresponding to attributes defined in a respective type definition for a given column,
  defining a type identifier column corresponding to a type identifier determined during the traversal of the tree structure, the type identifier column values corresponding to defined types in the table type hierarchy and determined by the tree traversal order.

19. The method of claim 18 wherein said transforming the source database including:

copying rows of data from the tables in the source database into the data transfer file, each row in the data transfer file having a type identifier column value corresponding to the table in the table type hierarchy of the source database which is the source of the data in the row in the data transfer file.

20. The method of claim 19, further comprising input steps for transforming data in the data transfer file to a target object relational database, the target object relational database having a table type hierarchy corresponding to the table type hierarchy of the source database, the input steps comprising copying each row of data in the data transfer file to a target table in the target database, the target table being identified by the type identifier column value for the row of data in the data transfer file, the data for each column in the row of data in the data transfer file being copied to the column in the target table as defined by the tree traversal order.

21. The method of claim 19 further comprising the step of accepting from the user a the tree traversal order definition and constraining the traversal order to be a depth-first, pre-order traversal.

22. The method of claim 19 further comprising the step of storing characteristics defining the table type hierarchy for the source database in the data transfer file.

23. The method of claim 19 in which the characteristics defining the table type hierarchy for the source database comprise a type identifier control table.

24. The method of claim 20 further comprising the step of storing hierarchy characteristics defining the table type hierarchy for the source database in the data transfer file and which further comprises the step of creating the table type hierarchy for the target database from the hierarchy characteristics.

25. The method of claim 24 in which the hierarchy characteristics comprise a type foal identifier control table.

26. The method of claim 19 in which the input step further comprises the step of accepting an attribute list from a user, the attribute list corresponding to specified columns in the data transfer file and inputting only the specified columns of data from the data transfer file to the target database.

27. A computer program product tangibly embodying a program of instructions executable by a computer to perform the method steps of claim 17.

28. A computer program product tangibly embodying a program of instructions executable by a computer to perform the method steps of claim 27.

* * * * *